United States Patent [19]
Shirota et al.

[11] Patent Number: 5,303,073
[45] Date of Patent: Apr. 12, 1994

[54] DISPERSION-TYPE LIQUID CRYSTAL DISPLAY ELEMENT WITH ORIENTED DICHROIC DYE IN THE SUPPORT MEDIA

[75] Inventors: Koichiro Shirota, Kawasaki; Kazuyuki Sunohara, Yokohama, both of Japan

[73] Assignee: Kabushiki Kaisha Toshiba, Kawasaki, Japan

[21] Appl. No.: 903,282

[22] Filed: Jun. 24, 1992

[30] Foreign Application Priority Data

Jun. 24, 1991 [JP] Japan .................. 3-151656

[51] Int. Cl.⁵ .............................................. G02F 1/13
[52] U.S. Cl. .................................... 359/51; 359/98
[58] Field of Search .................. 359/51, 52, 53, 96, 359/98

[56] References Cited

U.S. PATENT DOCUMENTS

| | | | |
|---|---|---|---|
| 3,726,584 | 4/1973 | Adams et al. | 359/43 |
| 4,241,339 | 12/1980 | Ushiyama | 359/53 X |
| 4,435,047 | 3/1984 | Fergason | 359/52 |
| 4,581,608 | 4/1986 | Aftergut et al. | 359/51 X |
| 4,688,900 | 8/1987 | Doane et al. | 359/88 X |
| 4,693,560 | 9/1987 | Wiley | 359/50 |
| 4,878,741 | 11/1989 | Fegason | 359/51 |
| 5,018,840 | 5/1991 | Ogawa | 359/51 |
| 5,132,815 | 7/1992 | Fergason | 359/51 |
| 5,194,973 | 3/1993 | Isogai et al. | 359/51 |

FOREIGN PATENT DOCUMENTS

| | | |
|---|---|---|
| 0251629 | 1/1988 | European Pat. Off. . |
| 58-501631 | 9/1983 | Japan . |
| 61-502128 | 9/1986 | Japan . |
| 63-66542 | 3/1988 | Japan . |
| 63-098631 | 5/1988 | Japan . |
| 2-083534 | 3/1990 | Japan . |
| 2226174 | 6/1990 | United Kingdom . |

*Primary Examiner*—William L. Sikes
*Assistant Examiner*—Kenneth Parker
*Attorney, Agent, or Firm*—Oblon, Spivak, McClelland, Maier & Neustadt

[57] ABSTRACT

A liquid crystal display element having a pair of substrates at least one of which is transparent, and a light control layer consisting of a dispersion type liquid crystal material held between the substrates. The dispersion type liquid crystal material consists of a supporting medium, liquid crystal molecules and a dichromatic dye which is oriented within the supporting medium. It is desirable to arrange a polarized light selecting element to cover the outer surface of one of the substrates. In one embodiment, the light control layer is of a laminate structure consisting of a first dispersion type liquid crystal layer prepared by allowing the dichromatic dye to be dispersed and oriented in a first direction within the supporting medium and a second dispersion type liquid crystal layer prepared by allowing another dichromatic dye, which is of the same type as that of the dichromatic dye dispersed in the first dispersion type liquid crystal layer, to be dispersed and oriented in a second direction within the supporting medium.

20 Claims, 2 Drawing Sheets

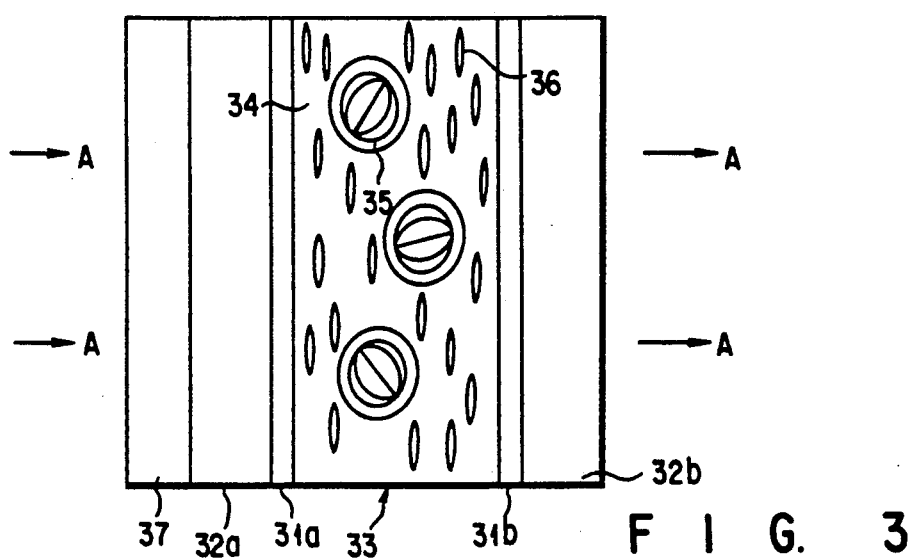
F I G. 3
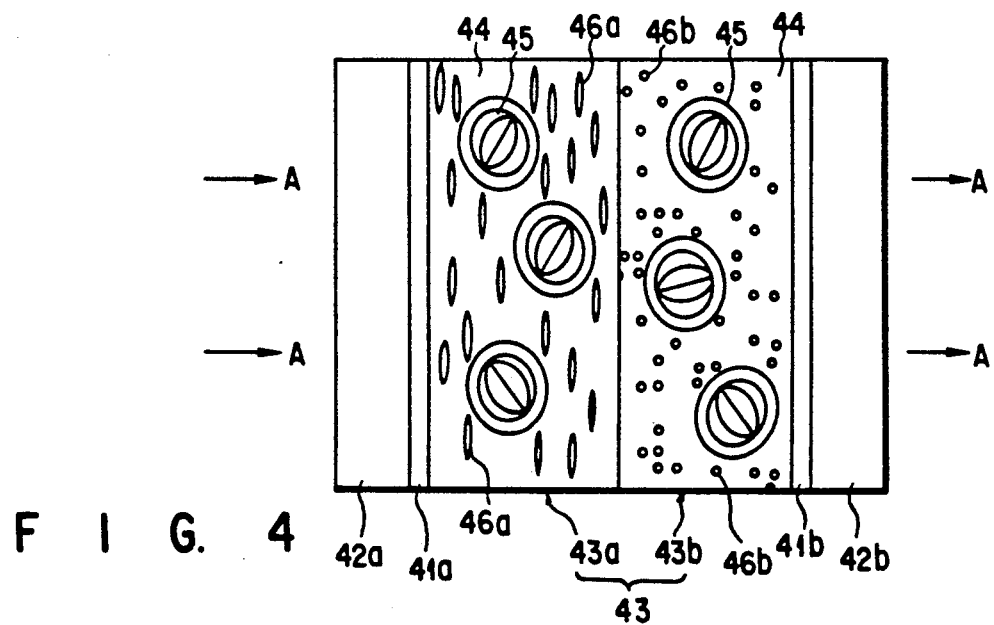
F I G. 4
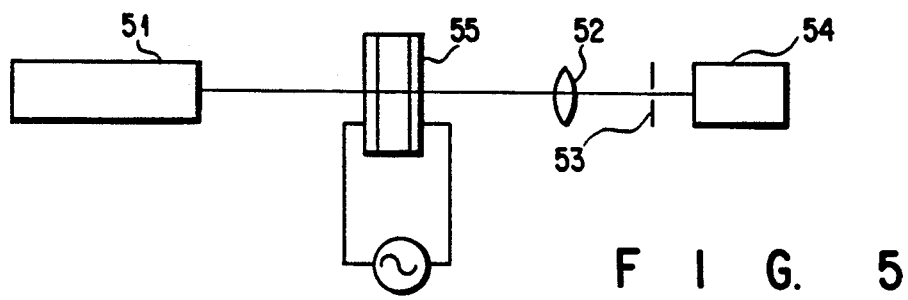
F I G. 5

DISPERSION-TYPE LIQUID CRYSTAL DISPLAY ELEMENT WITH ORIENTED DICHROIC DYE IN THE SUPPORT MEDIA

BACKGROUND OF THE INVENTION

1. Field of the Invention

The present invention relates to a dispersion type liquid crystal display element useful as, for example, a flat panel display device.

2. Description of the Related Art

Liquid crystal display elements of TN type and of STN type using a nematic liquid crystal have already been put to a practical use. Also, a liquid crystal display element using a ferroelectric liquid crystal is being proposed. In forming such an element, an orientation treatment or the like is required. This requirement is a serious problem to be solved for easily manufacturing a large liquid crystal display element.

On the other hand, methods of manufacturing a large liquid crystal display element at a low cost without depending on such an orientation treatment are disclosed in Published Unexamined Japanese Patent Application No. 58-501631 and U.S. Pat. No. 4,435,047. It is taught in these prior arts that liquid crystal molecules are encapsulated in polyvinyl alcohol or the like so as to disperse the liquid crystal molecules in the polymer. A thin film formed of the polymer prepared by the known method described above can be used for forming a liquid crystal display element. Where the encapsulated liquid crystal molecules exhibit a positive dielectric anisotropy within the thin film, the encapsulated liquid crystal molecules are oriented in the direction of the electric field upon application of an electric field. If the refractive index $n_o$ of the liquid crystal becomes equal to the refractive index $n_p$ of the polymer upon application of the electric field, the liquid crystal element is turned transparent. After removal of the electric field, the liquid crystal molecules are brought back to the state of random arrangement. As a result, the refractive index $n_o$ of the liquid crystal is deviated from the refractive index $n_p$ of the polymer. It follows that the light is scattered at the boundary between the liquid crystal phase and the polymer phase so as to make the liquid crystal display element turbidly.

Other types of a dispersion type liquid crystal display element using a thin film formed of a polymer having liquid crystal molecules dispersed therein are also known to the art. For example, Published Unexamined Japanese Patent Application No. 61-502128 discloses an element, in which liquid crystal molecules are dispersed in an epoxy resin. Also, Published Unexamined Japanese Patent Application No. 2-83534 discloses an element, in which liquid crystal molecules are dispersed in urethane acrylate resin.

Further, Published Unexamined Japanese Patent Application No. 63-66542 discloses a dispersion type liquid crystal display element, in which a fluorescent material is contained in at least one of the liquid crystal material which is to be encapsulated and a supporting medium so as to enable the light emitted from the fluorescent material to improve an effective contrast.

The dispersion type liquid crystal display element described above is certainly simpler in construction than the conventional element constructed such that a liquid crystal material is held between a pair of glass substrates and sealed, making it possible to form easily a larger element. In the dispersion type liquid crystal display element, however, a voltage application to the element simply brings about transmission and scattering of light, though the voltage application directly leads to an improved brightness of the background light in the conventional device noted above. To be more specific, when it comes to a dispersion type liquid crystal display element, light is scattered when voltage is not applied to the element so as to make the element white, and the element is made transparent upon voltage application. It should be noted that, in the dispersion type liquid crystal display element, the contrast is determined by the ratio in intensity of the transmitting light to the scattered light. Thus, in order to improve the contrast, it is necessary to collect the parallel transmitting light alone by, for example, diminishing the collecting angle of the scattered light in a dark state. Under the circumstances, Published Unexamined Japanese Patent Application No. 63-98631 discloses a liquid crystal display element, in which the encapsulated liquid crystal material comprises a background light supply portion and a selective light transmitting portion. However, the liquid crystal display element disclosed in this prior art necessitates a shutter serving to form a group of converging lenses and a group of apertures corresponding to the picture element regions, making it difficult to manufacture a large liquid crystal display element with a low cost.

SUMMARY OF THE INVENTION

An object of the present invention is to provide a liquid crystal display element of a satisfactory contrast, which can be of a large size and can be manufactured with a low cost.

According to a first embodiment of the present invention, there is provided a liquid crystal display element, having a pair of substrates at least one of which is transparent, and a light control layer consisting of a dispersion type liquid crystal material held between the substrates, the dispersion type liquid crystal material consisting of a supporting medium, liquid crystal molecules and a dichromatic dye which is oriented within the supporting medium.

In the liquid crystal display element of the first embodiment, a polarized light selecting element may be disposed outside the substrate.

According to a second embodiment of the present invention, there is provided a liquid crystal display element, having a pair of substrates at least one of which is transparent, and a light control layer consisting of a dispersion type liquid crystal material held between the substrates, the dispersion type liquid crystal material consisting of a supporting medium, liquid crystal molecules and a dichromatic dye, and the light control layer being of a laminate structure consisting of a first dispersion type liquid crystal layer prepared by allowing the dichromatic dye to be dispersed and, oriented in a first direction within the supporting medium material and a second dispersion type liquid crystal layer prepared by allowing another dichromatic dye, which is of the same type as that of the dichromatic dye dispersed in the first dispersion type liquid crystal layer, to be dispersed and oriented in a second direction within the dispersion type liquid crystal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2 to 4 are cross sectional views each showing a liquid crystal display element according to another embodiment of the present invention; and FIG. 5 schematically shows an optical system used for measuring the contrast of the liquid crystal display element of the present invention.

DETAILED DESCRIPTION OF THE PREFERRED EMBODIMENTS

Figure 1:
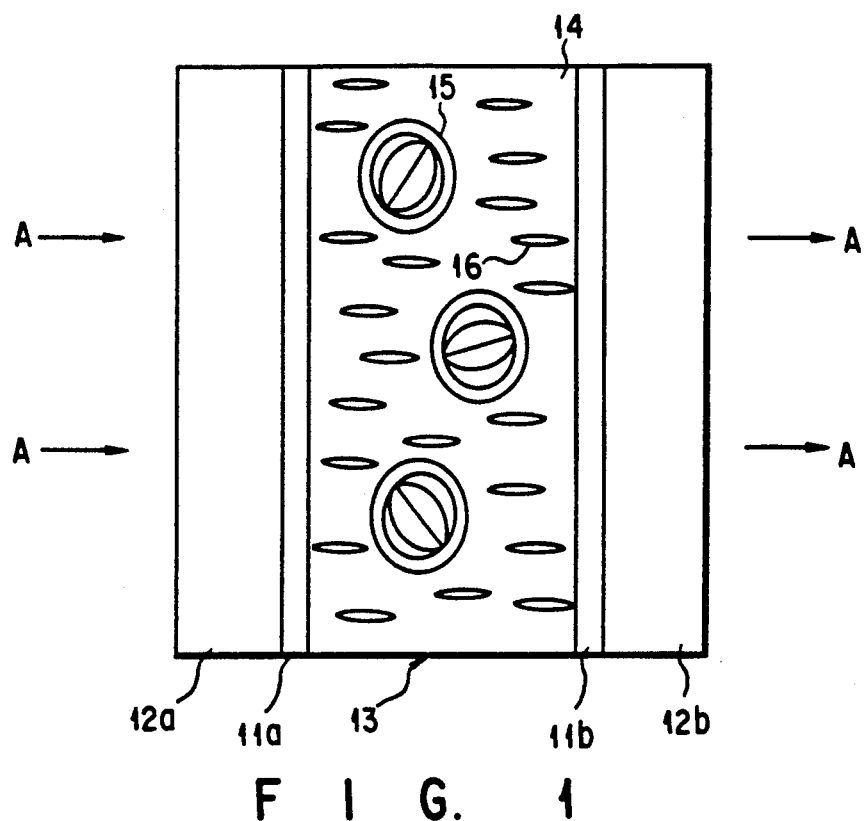
FIG. 1 is a cross sectional view showing a liquid crystal display element according to one embodiment of the present invention.

The dispersion type liquid crystal used in the present invention may be of the structure that liquid crystal portions are independently dispersed or of a three dimensional network structure. What is important in the present invention is that a matrix, i.e., a supporting medium of the dispersion type liquid crystal, is allowed to contain an oriented dichromatic dye. Specifically, the dichromatic dye may be mixed with the liquid crystal phase. Alternatively, liquid crystal molecules may be encapsulated in the form of micro droplets or spongy network so as to be separated from the dye. For preparing micro droplets or spongy network of the liquid crystal molecules, it is possible to use, for example, surfactant type monomer such as sodium undecylenate, as an encapsulating material.

Tables 1 to 4 exemplify the dichromatic dyes which can be used in the present invention. The dichromatic dyes used in the present invention include a positive dichromatic dye (p-type dye), in which the absorbance of the polarized light in a direction parallel with the molecular axis is greater than that of the polarized light in a direction perpendicular to the molecular axis, and a negative dichromatic dye (n-type dye) opposite to the p-type dye in the absorbance characteristics noted above. What should also be noted is that the dichromatic dye used in the liquid crystal display element of the present invention is required to exhibit a high dispersion capability in the matrix and should desirably exhibit a high resistivity for improving the holding characteristics of the liquid crystal display.

It should also be noted that the dichromatic dye tends to cause a decreased light transmission when voltage is applied to the liquid crystal display element, making it necessary not to unduly increase the content of the dichromatic dye. In the present invention, it is necessary to set the dichromatic dye content of the dispersion type liquid crystal at 10% by weight or less, preferably, at a level falling within a range of between 0.1 and 5% by weight.

TABLE 1

Chemical Structure of Pigment

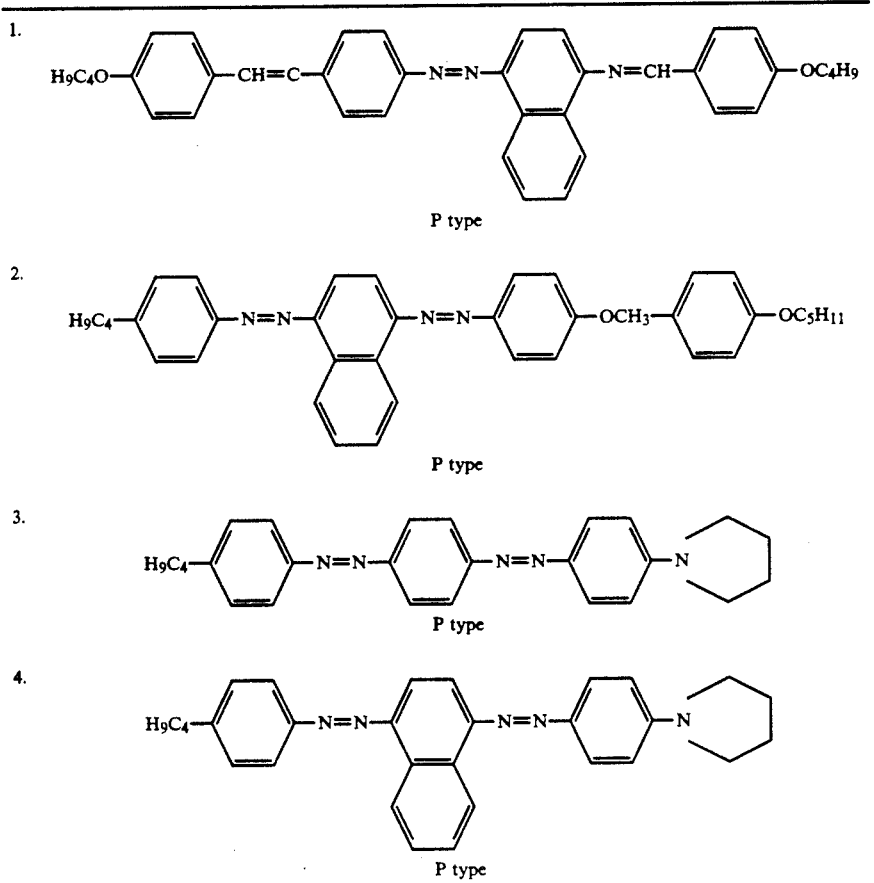

TABLE 1-continued
Chemical Structure of Pigment
5.
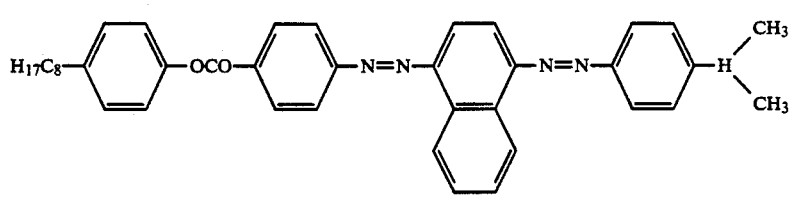
P type
6.
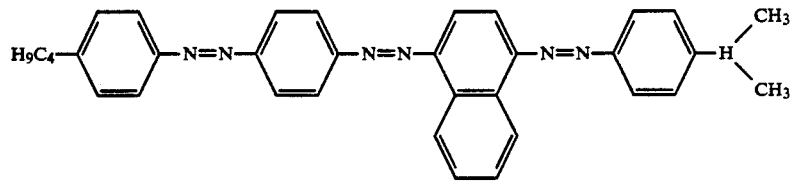
P type
7.
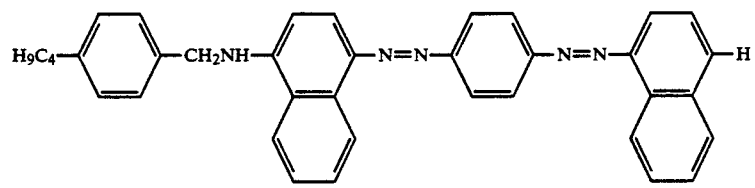
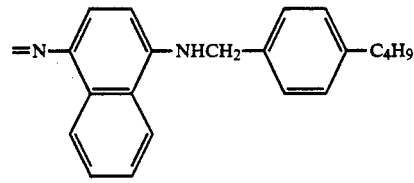
P type
TABLE 2
Chemical Structure of Pigment
8.
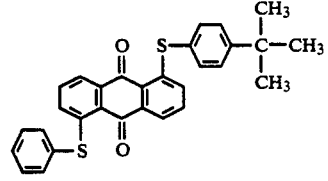
P type
9.
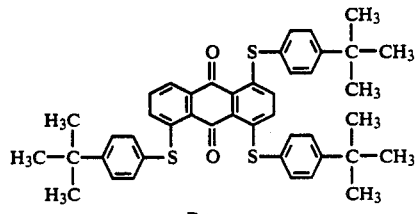
P type
TABLE 2-continued
Chemical Structure of Pigment
10.
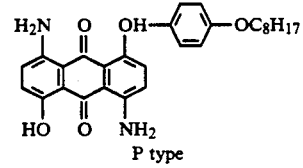
P type
11.
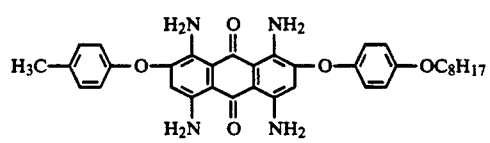
P type
12.
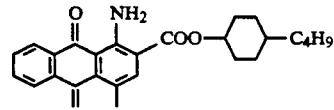
P type

TABLE 3

| | Chemical Structure of Pigment |
|---|---|
| 13. | 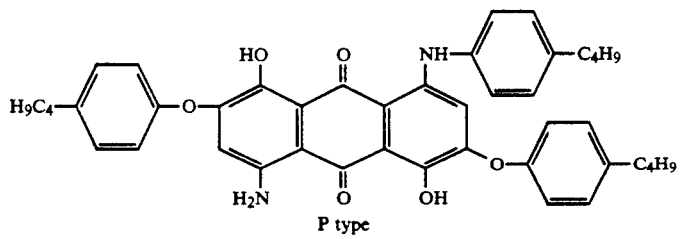 P type |
| 14. | 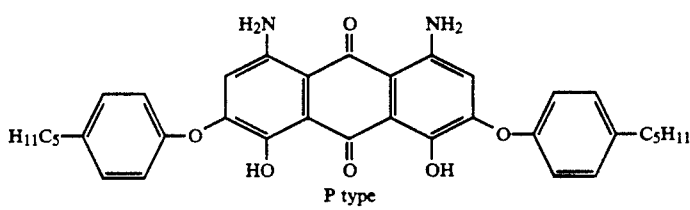 P type |
| 15. | 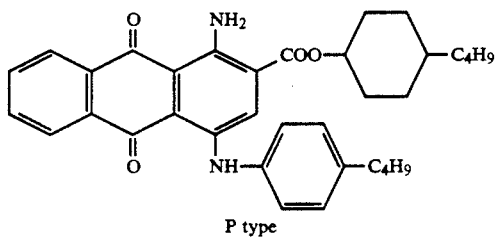 P type |
| 16. | 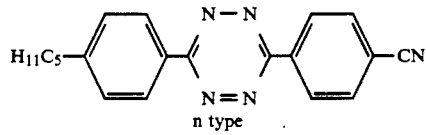 n type |
| 17. | 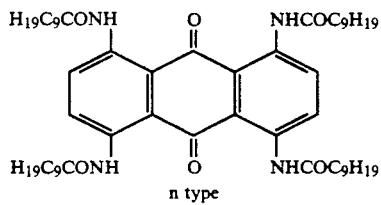 n type |

TABLE 4

| | Chemical Structure of Pigment |
|---|---|
| 18. | 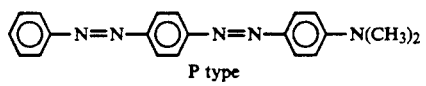 P type |
| 19. | 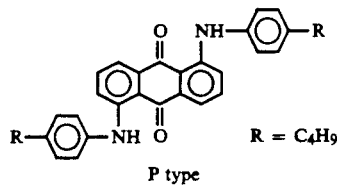 R = $C_4H_9$ P type |
| 20. | 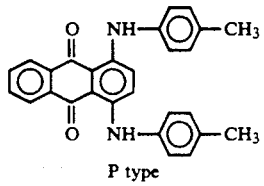 P type |

TABLE 4-continued

| | Chemical Structure of Pigment |
|---|---|
| 21. | 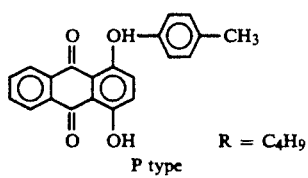 R = $C_4H_9$ P type |

The polarized light selecting element used in the present invention may be suitably selected from the known elements such as a polaroid plate, a Nicol prism, a Glan-Taylor prism, and a Glan-Thomson prism.

The liquid crystal displayer element of the particular construction described above permits forming a satisfactory dark state adapted for enabling the dichromatic dye to absorb the scattered light when a voltage is not applied to the element, making it possible to achieve a high contrast.

FIG. 1 shows a liquid crystal display element according to one embodiment of the present invention. In this embodiment, a p-type dichromatic dye, in which the long axis of the dye molecule coincides with the absorption axis, is oriented within a matrix. As seen from the drawing, the liquid crystal display element comprises a pair of substrates 12a and 12b each formed of, for example, glass. Transparent electrodes 11a, 11b each formed of ITO are on the inner surfaces of the substrates 12a, 12b, respectively. Further, a light control layer 13 consisting of a dispersion type liquid crystal is held between the substrates 12a, 12b.

The light control layer 13 is prepared by dispersing liquid crystal capsules 15 and p-type dichromatic dye 16 in a supporting medium 14 consisting of a photo-setting resin such as acrylic resin. It should be noted that the p-type dichromatic dye 16 are dispersed within the supporting medium 14 such that the light absorption axes of the dye molecules are oriented in a light transmitting direction denoted by arrows "A" in FIG. 1. In this case, the absorption axis of the p-type dichromatic dye 16 is parallel with the molecular axis.

In the liquid crystal display element shown in FIG. 1, the absorption axes of the p-type dichromatic dye 16 are oriented in the light transmitting direction "A". Thus, where light is incident in the direction "A", the light in which the electric field is vibrated within the display plane, i.e., the light transmitted in a direction substantially parallel with the orientation direction of the absorption axis, is transmitted as it is. On the other hand, the light transmitted in a direction making a certain angle with the direction of orientation is absorbed by the p-type dichromatic dye. It follows that, where an electric field is not applied to the liquid crystal display element, the light scattered by the liquid crystal portion is absorbed by the p-type dichromatic dye 16, and the transmitted light alone, which was not scattered, is emitted as a parallel light. Where an electric field is applied to the liquid crystal display element, the liquid crystal molecules are oriented so as to make the refractive index of the liquid crystal portion equal to that of the matrix and, thus, to permit the incident light to be transmitted as it is. Since the scattered light during non-application of an electric field is not transmitted, the dark state is markedly improved so as to provide a liquid crystal display element of a high contrast.

Figure 2:
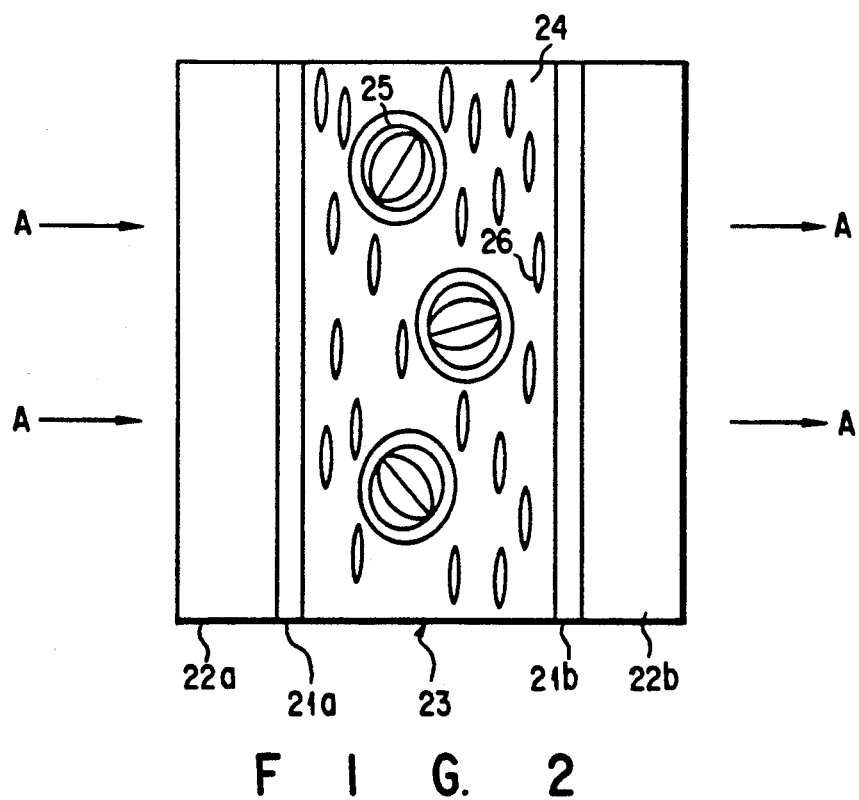

FIG. 2 shows a liquid crystal display element according to another embodiment of the present invention. In this embodiment, n-type dichromatic dye particles, in which the long axis of the dye molecule is perpendicular to the absorption axis, are oriented within the matrix. As seen from the drawing, the liquid crystal display element comprises a pair of transparent substrates 22a and 22b. Transparent electrodes 21a, 21b each formed of ITO are formed on the inner surfaces of the substrates 22a, 22b, respectively. Further, a light control layer 23 consisting of a dispersion type liquid crystal is held between the substrates 22a, 22b.

The light control layer 23 is prepared by dispersing liquid crystal capsules 25 and n-type dichromatic dye particles 26 in a supporting medium 24 consisting of a photo-setting resin such as acrylic resin. It should be noted that the n-type dichromatic dye particles 26 are dispersed within the supporting medium 24 such that the light absorption axes of the dye molecules are oriented in a light transmitting direction denoted by arrows "A" in FIG. 2. In this case, the absorption axis of the n-type dichromatic dye particle 26 is perpendicular to the molecular axis.

In the liquid crystal display element shown in FIG. 2, the absorption axes of the n-type dichromatic dye particles 26 are oriented in the light transmitting direction "A". Thus, where light is incident in the direction "A", the light in which the electric field is vibrated within the display plane, i.e., the light transmitted in a direction substantially parallel with the orientation direction of the absorption axis (direction perpendicular to the molecular axis), is transmitted as it is. On the other hand, the light transmitted in a direction making a certain angle with the direction of orientation is absorbed by the n-type dichromatic dye. It follows that, where an electric field is not applied to the liquid crystal display element, the light scattered by the liquid crystal portion is absorbed by the n type dichromatic dye particles 26, and the transmitted light alone, which was not scattered, is emitted as a parallel light. Where an electric field is applied to the liquid crystal display element, the liquid crystal molecules are oriented so as to make the refractive index of the liquid crystal portion equal to that of the matrix and, thus, to permit the incident light to be transmitted as it is. Since the scattered light during non-application of an electric field is not transmitted, the dark state is markedly improved so as to provide a liquid crystal display element of a high contrast.

FIG. 3 shows a liquid crystal display element according to another embodiment of the present invention. In this embodiment, p-type dichromatic dye particles, in which the long axis of the dye molecule coincides with the absorption axis, is oriented within a matrix. In addition, a polarized light selecting element is disposed to cover the outer surface of the substrate. As seen from the drawing, the liquid crystal display element of this embodiment comprises a pair of transparent substrates 32a and 32b. Transparent electrodes 31a, 31b each formed of ITO are formed on the inner surfaces of the substrates 32a, 32b, respectively. Further, a light control layer 33 consisting of a dispersion type liquid crystal is held between the substrates 32a and 32b. In addition, the display element further comprises a polarized light secting element 37 disposed to cover the outer surface of the substrate 32a on the incident side in a manner to face the light incident side of the light control layer 33.

The light control layer 33 is prepared by dispersing liquid crystal capsules 35 and p-type dichromatic dye particles 36 in a supporting medium 34 consisting of a photo-setting resin such as acrylic resin. It should be noted that the p-type dichromatic dye particles 36 are dispersed within the supporting medium 34 such that the light absorption axes of the dye molecules are oriented in a light transmitting direction denoted by arrows "A" in FIG. 3. In this case, the absorption axis of the p-type dichromatic dye particle 36 is oriented in a direction perpendicular to the light transmitting direction "A".

In the liquid crystal display element shown in FIG. 3, the molecular axes of the p-type dichromatic dye particles 36 are oriented in a direction perpendicular to the light transmitting direction. Since the incident light is selected by the polarized light selecting element 37 to select the polarization in the orienting direction of the dye, the liquid crystal molecules are oriented upon electric field application, with the result that the incident light is not scattered within the liquid crystal portion. It follows that, when voltage is applied to the element, the light incident to the matrix is absorbed substantially completely by the p-type dye which is oriented so as to achieve a very good dark state. On the other hand, the incident light is scattered in the liquid crystal portion, when voltage is not applied, so as to obtain a transmitted light.

FIG. 4 shows a liquid crystal display element according to still another embodiment of the present invention. In this embodiment, the light control layer included in the element is of a two-layer structure consisting of a first layer prepared by dispersing p-type dichromatic dye particles oriented in a light transmitting direction within a matrix and a second layer prepared by dispersing p-type dichromatic dye particles oriented in a direction perpendicular to the light transmitting direction within the matrix. These first and second layers are superposed one upon the other such that the molecular axis of the p-type dichromatic dye in the first layer is perpendicular to that in the second layer.

To be more specific, the liquid crystal display element of the embodiment shown in FIG. 4 comprises a pair of transparent substrates 42a and 42b. Transparent electrodes 41a, 41b each formed of ITO are formed on the inner surfaces of the substrates 42a, 42b, respectively. Further, a light control layer 43 consisting of a dispersion type liquid crystal is held between the substrates 42a and 42b.

The light control layer 43 comprises a first dispersion type liquid crystal layer 43a and a second dispersion type liquid crystal layer 43b, which are laminated one upon the other. The first dispersion type liquid crystal layer 43a is prepared by dispersing liquid crystal capsules 45 and p-type dichromatic dye particles 46a in a supporting medium 44 consisting of a photo-setting resin such as an acrylic resin. It should be noted in particular that the p-type dichromatic dye particles 46a are dispersed such that the absorption axes of the particles 46 are oriented in a direction perpendicular to the light transmitting direction denoted by arrows "A" in the drawing. Likewise, the second dispersion type liquid crystal layer 43b is prepared by dispersing liquid crystal capsules 45 and p-type dichromatic dye particles 46b in the supporting medium 44 consisting of a photo-setting resin such as an acrylic resin. In the second dispersion type liquid crystal layer 43b, however, the dichromatic dye particles 46b, which are of the same type as the p-type dichromatic dye particles 46a dispersed in the first dispersion type liquid crystal layer 43a, are dispersed so as to orient in a direction perpendicular to the orienting direction of the dichromatic dye particles 46a within the first dispersion type liquid crystal layer 43a.

As described above, the first and second dispersion type liquid crystal layers superposed one upon the other in the embodiment shown in FIG. 4 such that the orienting direction of the dichromatic dye particles within the first layer is perpendicular to that within the second layer. In this case, the scattered light is effectively absorbed by the dichromatic dye particles oriented at right angles, with the result that the liquid crystal display element constructed as shown in FIG. 4 permits achieving a contrast equivalent or superior to that of the liquid crystal display element constructed as shown in FIG. 3, though the element shown in FIG. 4 is not provided with a polarized light selecting element. Incidentally, the light control layer included in the element shown in FIG. 4 may be of a laminate structure consisting of three or more dispersion type liquid crystal layers.

In the liquid crystal display element constructed as shown in FIG. 1, the dichromatic dye particles are oriented within the matrix such that the long axis of the dye molecule is parallel with the light transmitting direction, as described previously. It is possible to achieve the particular construction by applying an electric field or a magnetic field in the step of obtaining the dispersion type liquid crystal by mixing the dichromatic dye particles with the matrix material. It should be noted, however, that, if the dichromatic dye particles are dispersed at a temperature lower than the level at which the host liquid crystal exhibits an isotropic phase, the light transmittance during non-application of an electric field is increased, leading to a lowered contrast, though the threshold value of the electric field is lowered by the orientation of the liquid crystal molecules regulated by the external field. In order to avoid the impaired contrast, it is desirable to carry out the orientation of the dichromatic dye particles at a temperature higher than the level at which the host liquid crystal exhibits an isotropic phase. Further, where the matrix material contains a polymer compound, it is desirable to set the temperature at a level higher than the glass transition temperature of the polymer compound in order to facilitate the orientation of the dichromatic dye particles.

In the liquid crystal display element constructed as shown in FIG. 2 or 3, the dichromatic dye particles are oriented within the matrix such that the long axis of the dye molecule is perpendicular to the light transmitting direction, as described previously. It is possible to achieve the particular orientation by applying a drawing treatment to the dispersion type liquid crystal layer mixed with the dichromatic dye particles in a direction perpendicular to the light transmitting direction. The contrast of the liquid crystal display element can be improved with increase in the drawing rate in the drawing treatment. It is desirable in some cases to carry out the drawing treatment at a temperature higher than a level at which the host crystal exhibits an isotropic phase. It should also be noted that the moderating time of response of the liquid crystal display element is affected by the drawing treatment.

In each of the embodiments described above, a transparent electrode consisting of ITO is formed on the inner surface of the substrate. However, it is possible to omit the transparent electrode.

Examples of the present invention described in the following are believed to further clarify the particular effects produced by the liquid crystal display element of the present invention.

EXAMPLE 1

A liquid crystal mixture was obtained by dispersing spacer material sized at 13 microns in a solution containing 11% by weight of butyl acrylate, 8% by weight of M-120 (trade name of an acrylic oligomer manufactured by Toa Gosei Kagaku Inc.), 1.0% by weight of Darocure 1116 (trade name of a photo-setting initiator manufactured by E. Merk Ltd.), 79% by weight of E-8 (registered trade mark of a host liquid crystal manufactured by BDH Ltd.), and 1% by weight of D-37 (registered trade mark of an anthraquinone series dye manufactured by BDH Inc.) which was used as a p-type dye. Used as the spacer material was micropearl SP-213 (registered trade name, Sekisui Fine Chemical Inc.).

A pair of glass substrates each covered with an ITO film were coated with the liquid crystal mixture thus prepared, followed by superposing the glass substrates one upon the other such that the coating layers were indirect contact with each other. Then, a poling treatment was applied for 30 minutes at 85° C. under a poling electric field of 300 kV/cm, followed by applying an light exposure treatment for 2 minutes with the electric field kept applied so as to prepare a dispersion type liquid crystal display element constructed as shown in FIG. 1, i.e., a p-type dye particle perpendicular-orientation type element. The light exposure treatment noted above was carried out by using Minicure 450 (registered trade mark of an ultraviolet light irradiating apparatus manufactured by Ushio Denk Inc.).

The contrast of the liquid crystal display element thus prepared was measured by using an optical system shown in FIG. 5. As shown in the drawing, the optical system is formed by arranging a helium-neon laser 51, a lens 52, an aperture 53 and a photodiode 54 on an optical path. For measuring the contrast, the dispersion type liquid crystal display element 55 was disposed between the helium-neon laser 51 and the lens 52, and a voltage ranging between 0 and 20 V was applied to the dispersion type liquid crystal display element by using a function generator under a condition of wavelength of 633 nm, pulse signal of a rectangular waveform of 1 kHz, output power of 0.5 mW. The contrast thus measured was found to be 1:101.

EXAMPLE 2

A liquid crystal mixture was obtained by dispersing a spacer material sized at 13 microns in a solution containing 15% by weight of isododecyl acrylate, 10% by weight of C-2000 (registered trade mark of an aliphatic diacrylate having a long carbon chain, which is manufactured by SATOMER Inc.), 1.0% by weight of Darocure 1116, i.e., a photo-setting initiator referred to previously, 73.2% by weight of E-7 (registered trade mark of a host liquid crystal manufactured by BDH Ltd.), and 0.8% by weight of D-37, i.e., an anthraquinone series dye which was also used in Example 1 as a p-type dye.

A pair of glass substrates each covered with an ITO film were coated with the liquid crystal mixture thus prepared, followed by superposing the glass substrates one upon the other such that the coating layers were in direct contact with each other. Then, a poling treatment was applied for 30 minutes at 75° C. under a poling electric field of 300 kV/cm, followed by applying an light exposure treatment for 90 seconds with the electric field kept applied so as to prepare a dispersion type liquid crystal display element constructed as shown in FIG. 1. The light exposure treatment noted above was carried out by using Minicure 450 referred to previously.

The contrast of the liquid crystal display element thus prepared was measured as in Example 1, with the result that the contrast was found to be 1:98.

EXAMPLE 3

A mixture consisting of 38.8% by weight of Elvacite 2008 (registered trade mark of a polymethyl methacrylate manufactured by Du Pont Inc.), 60% by weight of E-44 (registered trade mark of a host liquid crystal manufactured by BDH Ltd.), and 1.2% by weight of an anthraquinone series dye shown in Table 3 as compound No. 17, which was used as an n-type dye, was dissolved in chloroform and the resultant solution was sufficiently stirred. Then, the surface of a Teflon plate was coated with the solution by using a bar coater, followed by drying the coating at 100° C. for 2 minutes so as to prepare a dispersion type liquid crystal film having a thickness of 20 microns and containing n-type dichromatic dye particles. The film thus prepared was drawn by 200% by a drawing machine under a nitrogen gas atmosphere of 120° C., followed by coating the both surfaces of the drawn film with an optical adhesive No. 68 manufactured by Norland Products, Inc. by using a bar coater. Further, the coated film was held between and compressed by a pair of glass substrates each having an ITO film formed on one surface in advance so as to prepare dispersion type liquid crystal display element constructed as shown in FIG. 2, i.e., a n-type dye particles paralle-orientation type element.

The contrast of the liquid crystal display element thus prepared was measured as in Example 1, with the result that the contrast was found to be 1:95.

EXAMPLE 4

A mixture was prepared first by sufficiently dispersing 11% by weight of butyl acrylate, 8% by weight of M-120, i.e., an acrylic oligomer referred to in Example 1, 1.0% by weight of Dalocure 1116, i.e., a photo-setting initiator referred to in Example 1, 79% by weight of E-8, i.e., a host liquid crystal referred to previously, and 1% by weight of an anthraquinone series dye which is shown as compound No. 17 in Table 3 and used as an n-type dye. Then, the surface of a Teflon plate was coated with the mixture by using a bar coater, followed by applying a light exposure treatment for 2 minutes by using Minicure 450, i.e., an ultraviolet light irradiating apparatus referred to previously, so as to prepare a dispersion type liquid crystal display element constructed as shown in FIG. 2 and containing n-type dichromatic dye particles. The film thus prepared was drawn by 150% by a drawing machine at 90° C., followed by coating the both surfaces of the drawn film with an optical adhesive No. 68 manufactured by Norland Products, Inc. by using a bar coater. Further, the coated film was held between and compressed by a pair of glass substrates each having an ITO film formed one surface in advance so as to prepare dispersion type liquid crystal display element constructed as shown in FIG. 2.

The contrast of the liquid crystal display element thus prepared was measured as in Example 1, with the result that the contrast was found to be 1:96.

EXAMPLE 5

A mixture consisting of 38.8% by weight of Elvacite 2008, i.e., a polymethyl methacrylate referred to previously, 60.1% by weight of E-44, i.e., a host liquid crystal referred to previously, and 1.1% by weight of an azo type dye D-2 manufactured by BHD Ltd., which was used as a p-type dye, was dissolved in chloroform and the resultant solution was sufficiently stirred. Then, the surface of a Teflon plate was coated with the solution by using a bar coater, followed by drying the coating at 100° C. for 2 minutes so as to prepare a dispersion type liquid crystal film having a thickness of 20 microns and containing p-type dichromatic dye particles. The film thus prepared was drawn by 200% by a drawing machine under a nitrogen gas atmosphere of 120° C., followed by coating the both surfaces of the drawn film with an optical adhesive No. 68 manufactured by Norland Products, Inc. by using a bar coater. Further, the coated film was held between and compressed by a pair of glass substrates each having an ITO film formed on one surface in advance. Finally, a light deflecting plate was attached to one of the substrates so as to prepare dispersion type liquid crystal display element constructed as shown in FIG. 3, i.e. a p-type dye particles parallel-orientation type element.

The contrast of the liquid crystal display element thus prepared was measured as in Example 1, with the result that the contrast was found to be 1:96.

EXAMPLE 6

Two dispersion type liquid crystal films each containing p-type dye particles were prepared as in Example 5. Each of these films was drawn by 200% by using a drawing machine under a nitrogen gas atmosphere of 120° C., followed by coating one surface of each of these films with an optical adhesive No. 68 manufactured by Norland Inc. by using a bar coater. Then, these two films were superposed one upon the other such that the orienting axes of the films are perpendicular to each other so as to obtain a film of a laminated structure. Further, the both surfaces of the laminated film were coated with an optical adhesive. Finally, the laminated film was held between and compressed by a pair of glass substrates each having an ITO film formed on one surface in advance so as to obtain a dispersion type liquid crystal display element constructed as shown in FIG. 4, in which the orienting direction of the p-type dyes parallel-orientation-perpendicular-stack type element.

The contrast of the liquid crystal display element thus prepared was measured as in Example 1, with the result that the contrast was found to be 1:99.

As described above in detail, the present invention provides a liquid crystal display element in which dichromatic dye particles are contained and oriented in a dispersion type liquid crystal matrix. The particular construction of the present invention makes it possible to manufacture even a large liquid crystal display device very easily and with a low cost. In addition, it is possible to markedly improve the contrast of the liquid crystal display element. What should also be noted is that a complex optical system or the like need not be used in the dispersion type liquid crystal display element of the present invention and, thus, the element of the present invention is economical.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A liquid crystal display element comprising:
    a pair of substrates at least one of which is transparent; and
    a light control layer consisting of a dispersion type liquid crystal material disposed between the substrates, said dispersion type liquid crystal material comprising,
    a support medium,
    liquid crystal molecules, and
    a dichromatic dye which is oriented within the supporting medium and located separate from said liquid crystal molecules in the supporting medium, said dichromatic dye having an absorption axis perpendicular to a plane of the substrates.

2. The liquid crystal display element according to claim 1, wherein said liquid crystal molecules are dispersed in the light control layer in the form of micro droplets or spongy network.

3. The liquid crystal display element according to claim 1, wherein said liquid crystal molecules are encapsulated in a surfactant type monomer.

4. The liquid crystal display element according to claim 1, wherein said dichromatic dye is n-type or p-type.

5. The liquid crystal display element according to claim 1, wherein the dispersion type liquid crystal material contains said dichromatic dye in an amount of 10% by weight or less.

6. The liquid crystal display element according to claim 1, wherein the supporting medium is made of a photosetting resin.

7. A liquid crystal display element comprising:
    a pair of substrates at least one of which is transparent;
    a light control layer consisting of a dispersion type liquid crystal material disposed between the substrates; and
    a polarized light selecting element arranged adjacent an outer surface of the substrates;
    said dispersion type liquid crystal material comprising,
    a supporting medium,
    liquid crystal molecules, and
    a dichromatic dye which is oriented within the supporting medium and located separate from said liquid crystal molecules in the supporting medium, said dichromatic dye having an absorption axis parallel to a plane of the substrates and perpendicular to an absorption axis of the polarized light selecting element.

8. The liquid crystal display element according to claim 7, wherein said polarized light selecting element is a polaroid plate.

9. The liquid crystal display element according to claim 7, wherein said liquid crystal molecules are dispersed in the light control layer in the form of micro droplets or spongy network.

10. The liquid crystal display element according to claim 7, wherein the liquid crystal molecules are encapsulated in a surfactant type monomer.

11. The liquid crystal display element according to claim 7, wherein said dichromatic dye is n-type or p-type.

12. The liquid crystal display element according to claim 7, wherein the dispersion type liquid crystal material contains said dichromatic dye in an amount of 10% by weight or less.

13. The liquid crystal display element according to claim 7, wherein the supporting medium is made of a photosetting resin.

14. A liquid crystal display element comprising:
    a pair of substrates at least one of which is transparent; and
    a light control layer held between the substrate and comprising first and second dispersion type liquid crystal materials formed in a laminate structure;
    said first dispersion type liquid crystal material comprising,
    a first supporting medium, first liquid crystal molecules disposed in said first supporting medium, a first dichromatic dye located in said first supporting medium separate from said first liquid crystal molecules and oriented in said supporting medium in a first direction; and said second dispersion type liquid crystal material comprising, a second supporting medium, second liquid crystal molecules disposed in said second supporting medium, a second dichromatic dye located in said second supporting medium separate form said second liquid crystal molecules and oriented in said second supporting medium in a second direction.

15. The liquid crystal display element according to claim 14, wherein said first direction is perpendicular to said second direction.

16. The liquid crystal display element according to claim 14, wherein said liquid crystal molecules are dispersed in the light control layer in the form of micro droplets or spongy network.

17. The liquid crystal display element according to claim 14, wherein the first and second liquid crystal molecules are encapsulated in a surfactant type monomer.

18. The liquid crystal display element according to claim 14, wherein said first and second dichromatic dyes are n-type or p-type.

19. The liquid crystal display element according to claim 14, wherein the first and second dispersion type liquid crystal materials contain respective of said dichromatic dyes in an amount of 10% by weight or less.

20. The liquid crystal display element according to claim 14, wherein the first and second supporting mediums are made of a photosetting resin.

* * * * *